United States Patent [19]

Radman, Jr. et al.

[11] 4,375,656
[45] Mar. 1, 1983

[54] MAGNETIC HEAD ASSEMBLY WITH ASYMMETRIC SLOTTED CONFIGURATION

[75] Inventors: Anton J. Radman, Jr., Ogden, Utah; Ricardo Yudico, Tucson, Ariz.

[73] Assignee: International Business Machines Corporation, Armonk, N.Y.

[21] Appl. No.: 195,585

[22] Filed: Oct. 9, 1980

[51] Int. Cl.³ .......................... G11B 5/22; G11B 17/32
[52] U.S. Cl. ..................................... 360/102; 360/122
[58] Field of Search ................. 360/102, 103, 99, 122

[56] References Cited

U.S. PATENT DOCUMENTS

| | | | |
|---|---|---|---|
| 3,384,882 | 5/1968 | Geurst et al. | 340/174.1 |
| 3,678,482 | 7/1972 | Billawala | 340/174.1 E |
| 3,922,776 | 12/1975 | Alger et al. | 29/603 |

OTHER PUBLICATIONS

IBM Technical Disclosure Bulletin, vol. 20, No. 1, 6/77, p. 37, "Multiple Slotted Head Contour," Brock et al.

Bengal et al., "Nonuniform... Recording", IBM Tech. Disc. Bull., vol. 22, No. 4, Sep. 1979, p. 1600.

*Primary Examiner*—Robert S. Tupper
*Attorney, Agent, or Firm*—Nathan N. Kallman

[57] ABSTRACT

A flexible disk file employs a pivotable head arm which supports a grooved magnetic head. The magnetic head is formed with an asymmetric groove so that skew of the head relative to the rotating flexible disk surface is compensated.

4 Claims, 5 Drawing Figures

MAGNETIC HEAD ASSEMBLY WITH ASYMMETRIC SLOTTED CONFIGURATION

DESCRIPTION

Technical Field

This invention relates to a magnetic head assembly and in particular to a magnetic head assembly mounted to a pivotable arm for use in a floppy disk file.

An object of this invention is to provide a magnetic head structure that affords compensation for skew experienced by a pivotable magnetic head relative to a floppy disk.

Background Art

Floppy disk files generally employ a nonrigid magnetic disk as the recording medium which cooperates in transducing relation with a movable magnetic head. The transducing gap portion of the magnetic head may be in intimate contact with the floppy disk or in psuedo-contact, in which case there is an infinitesimal spacing between the magnetic transducer and the disk surface.

In those disk files where the head arm is pivoted in an arcuate path over concentric data tracks on the disk, in a substantially radial direction, differences in orientation of the magnetic head relative to the disk surface are experienced, as the head is moved between the inner data tracks and outer data tracks. Specifically, head skew may be as much as 35° to 180° relative to the tangential line of the disk at the outer track, and thus the transducing gap may no longer be properly aligned with selected data tracks on the floppy disk.

BRIEF DESCRIPTION OF THE DRAWING

The invention will be described in detail with reference to the drawing in which.

DISCLOSURE OF THE INVENTION

Figure 1:
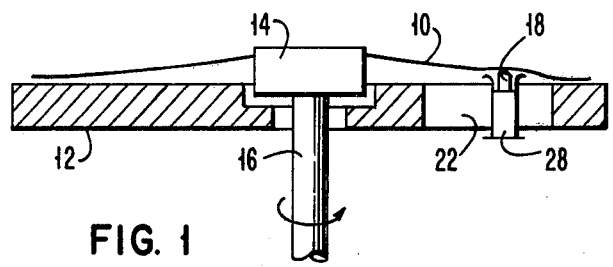
FIG. 1 is a cross-sectional representational view of a floppy disk file.
Figure 2:
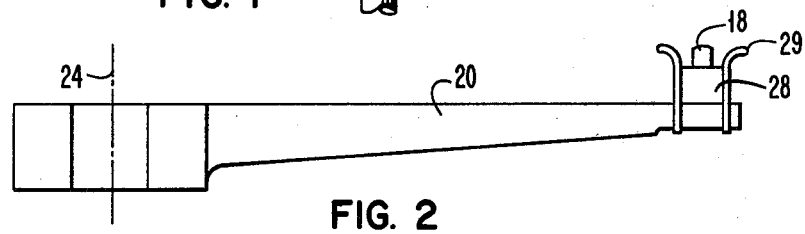
FIG. 2 is a side view of a pivotable head arm assembly.
Figure 3:
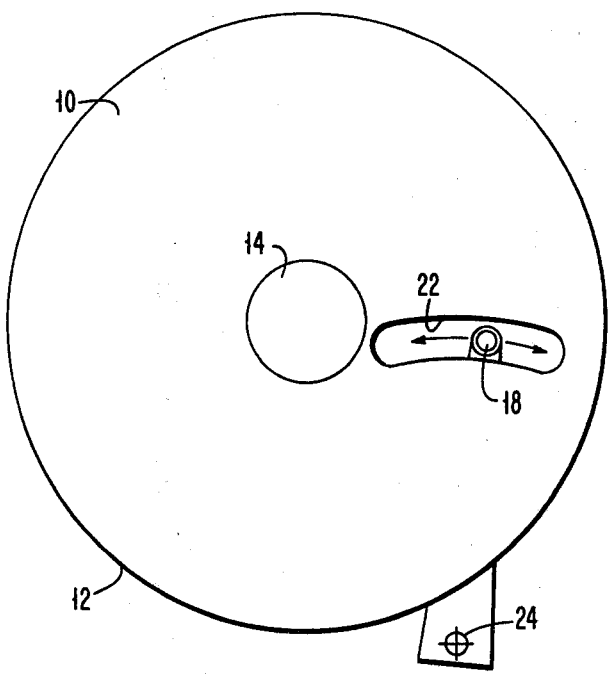
FIG. 3 is a plan view illustrating a floppy disk and pivotable head arm assembly.

With reference to FIG. 1, a disk drive comprises a flexible or floppy disk 10 supported by a rigid metal plate 12. The disk is mounted to a central hub 14 which is rotatable on a drive shaft 16. The hub 14 is also detachable from the drive shaft 16. A head assembly 18 is supported at an end of a pivotable arm 20 which is mounted to a rotatable shaft (not shown). The head arm 20 pivots about a pivot point 24, as illustrated in FIG. 2. The head assembly 18 is positioned to coact with the floppy disk 10 in transducing relation. As depicted in FIG. 3, an arcuate slot 22 is formed in the plate 12 to allow the head assembly 18 to engage the disk 10 over a radial path as the disk 10 is rotated and the arm 20 is moved in an arcuate path.

Figure 4:
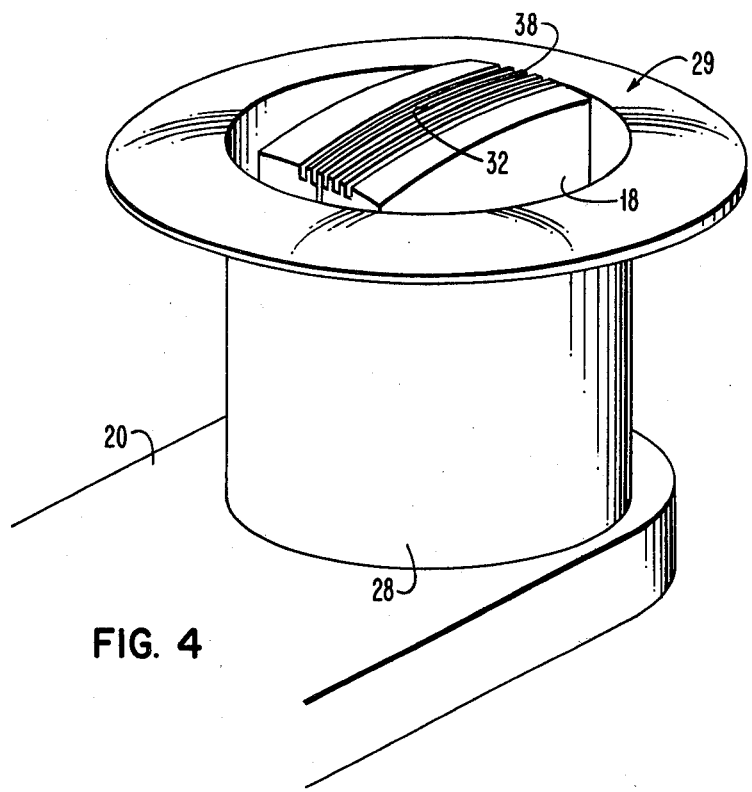
FIG. 4 is an enlarged view of a portion of the head arm assembly depicted in FIG. 3.

With reference to FIG. 4, the head assembly 18, which is formed from a ferrite or ceramic slab and has a contoured face 26, is positioned within a cylindrical housing 28, on the arm 20. The cylindrical housing 28 is sealed at the bottom from ambient air. The housing 28 has a toroidal surface 29 or an extending annular section at the top, which contacts the floppy disk 10 during operation.

Figure 5:
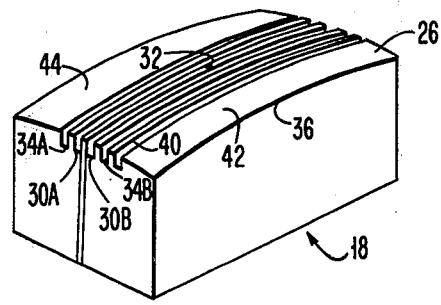
FIG. 5 is an isometric view of a magnetic head configuration, in accordance with this invention.

The contoured face 26 incorporates a pair of central grooves 30A, 30B surrounding a transducing gap 32, as depicted in FIG. 5. In addition, a pair of spaced parallel grooves 34A, 34B respectively are provided on either side of the central grooves 30A, 30B. The two pairs of symmetrically disposed grooves and the cylindrical housing 28 provide a pressure differential that draws the floppy disk towards the head in a closely spaced relationship between the head 18 and disk 10.

During operation of the disk drive, the head assembly 18 is very closely spaced from the surface of the disk 10 by virtue of the air pressure differential generated between the rotating disk and the grooves 30 and 34 of the head assembly and the cylindrical housing 28. However, it has been found that as the head 18 is moved, by rotation of the arm 20, from the inner data tracks on the disk to the outer data tracks, a skewed relationship is produced between the head, 18 and the tangential line of the disk surface at the outer tracks of the disk. In effect, that area of the flexible disk surface that flies at the closest spacing from the head is displaced radially and inwardly relative to the center rail 38 of the head, such that the selected data track is not in proper alignment with the transducing gap 32. As a result, signal distortion and error are experienced.

In keeping with this invention, an additional asymmetrically disposed groove 40 is formed at the surface of the magnetic head 18, as illustrated in FIG. 5. The offset groove 40 is located between the groove 34b and the outer edge 36 of the head, and is configured to be parallel and of the same depth as the paired grooves 30a,b and 34a,b. The additional groove 40 acts to create a pressure differential such that the outer rail portions 42 and 44 of the head 10 closest to the groove 40 will be spaced further from the disk surface, and the transducer gap will be spaced closer to the flexible disk surface. The magnitude of relative movement of the head portions 42 and 44 and the disk surface increases at the outer tracks, which rotate at greater speeds than the inner tracks. This relative movement resulting from the additional groove 40 compensates for the skewed relation between the disk surface and the head gap surface. The asymmetrical grooved configuration causes the portion of the flexible disk that flies closest to the head face 26 to be located adjacent to the center rail 38 and the transducing gap 32. In this way, the magnetic head 18 will be closely spaced from the flexible disk surface so that signal amplitude and resolution are effectively improved.

An alternative to the additional asymmetric groove 40 is to provide a widened groove 34a, which is the groove closest to the periphery of the flexible disk. For example, if the grooves 30a,b and 34a are 0.004 inch wide, then the outboard groove 34b may be 0.008 inch wide.

By means of this invention, a head assembly is centered in closely spaced relation over data tracks recorded on a flexible disk, at the outer tracks as well as the inner tracks.

What is claimed is:

1. A magnetic head assembly useful for transducing coaction with a flexible magnetic disk comprising:
   a support arm;

a magnetic head mounted to said arm, said head having a contoured face with a centrally located transducing gap;

first and second grooves formed on said contoured face and symmetrically disposed about said transducing gap with the axes of said grooves being substantially perpendicular to the axis of said transducing gap;

third and fourth grooves formed on said contoured face and disposed parallel to said first and second grooves and spaced symmetrically about said first and second grooves and said transducing gap, said first and third grooves being located inboard of said gap, said second and fourth grooves being located outboard of said gap;

an offset groove formed on said contoured face outboard of said fourth groove towards the outer portion of said head relative to the periphery of said disk, all of said grooves being substantially parallel on said contoured face.

2. A magnetic head assembly as in claim 1, wherein said support arm is pivotable.

3. A magnetic head assembly as in claim 1, wherein said magnetic head is formed from a ferrite or ceramic slab.

4. A magnetic head assembly useful for transducing coaction with a flexible magnetic disk comprising:

a pivotable support arm;

a magnetic head mounted to said arm, said head having a contoured face having a centrally located transducing gap;

first and second grooves formed on said contoured face and symmetrically disposed about said transducing gap with the axes of said grooves being substantially perpendicular to the axis of said transducing gap;

third and fourth grooves formed on said contoured face and disposed parallel to said first and second grooves and spaced about said first and second grooves and said transducing gap, said first and third grooves being located inboard of said gap, said second and fourth grooves being located outboard of said gap;

said first, second and third grooves having the same width; and said fourth groove being wider than said first, second and third grooves so that head skew relative to the disk is compensated.

* * * * *